(No Model.) 7 Sheets—Sheet 1.

G. H. SPECHT.
BOOK COVERING MACHINE.

No. 555,910. Patented Mar. 3, 1896.

Witnesses
F. L. Ourand
Jos. Gregory

Inventor
George H. Specht,
per E. O. Bradford
and E. P. Hay,
his Attorneys.

(No Model.) 7 Sheets—Sheet 4.

G. H. SPECHT.
BOOK COVERING MACHINE.

No. 555,910. Patented Mar. 3, 1896.

Witnesses
F. L. Ourand
Jos Gregory

Inventor
George H. Specht
per E.W. Bradford
and E.B. Abbey
his Attorneys (No Model.) 7 Sheets—Sheet 5.

G. H. SPECHT.
BOOK COVERING MACHINE.

No. 555,910. Patented Mar. 3, 1896.

Witnesses
F. L. Ourand
Jos. Gregory

Inventor
George H. Specht
per E. O. Bradford
and E. R. Hay
his Attorneys

(No Model.)

G. H. SPECHT.
BOOK COVERING MACHINE.

No. 555,910. Patented Mar. 3, 1896.

Witnesses
F. L. Ourand
Jos Gregory

Inventor
George H. Specht,
per E. W. Bradford
and E. B. Hay
his Attorneys.

UNITED STATES PATENT OFFICE.

GEORGE H. SPECHT, OF LOUISVILLE, KENTUCKY.

BOOK-COVERING MACHINE.

SPECIFICATION forming part of Letters Patent No. 555,910, dated March 3, 1896.

Application filed July 27, 1895. Serial No. 557,370. (No model.)

*To all whom it may concern:*

Be it known that I, GEORGE H. SPECHT, a citizen of the United States, residing at Louisville, in the county of Jefferson and State of Kentucky, have invented certain new and useful Improvements in Book-Covering Machines; and I do hereby declare the following to be a full, clear, and exact description of the invention, such as will enable others skilled in the art to which it appertains to make and use the same.

My said invention consists in various improvements in the construction and arrangement of parts of pamphlet-covering machines, particularly that class of said machines such as is shown in Patent No. 534,219, issued February 12, 1895, as will be hereinafter fully described and claimed.

Referring to the accompanying drawings, which are made a part hereof and on which similar letters of reference indicate similar parts, Fig. 13, a similar view of a section of the housing $A^3$ and frame, showing the means of connecting same more clearly; Fig. 15, a similar view of the locking device for locking the gear-wheel $b^2$; Fig. 16, a plan view of the interrupted gear-wheel $a^6$.

In said drawings, the portions marked A represent the frame; B B', two series of driving or carrying rolls; C, the glue-applying roll; D, the cover-table; E, the back-perfecting table, and F the book-discharging device.

Figures 1, 17:
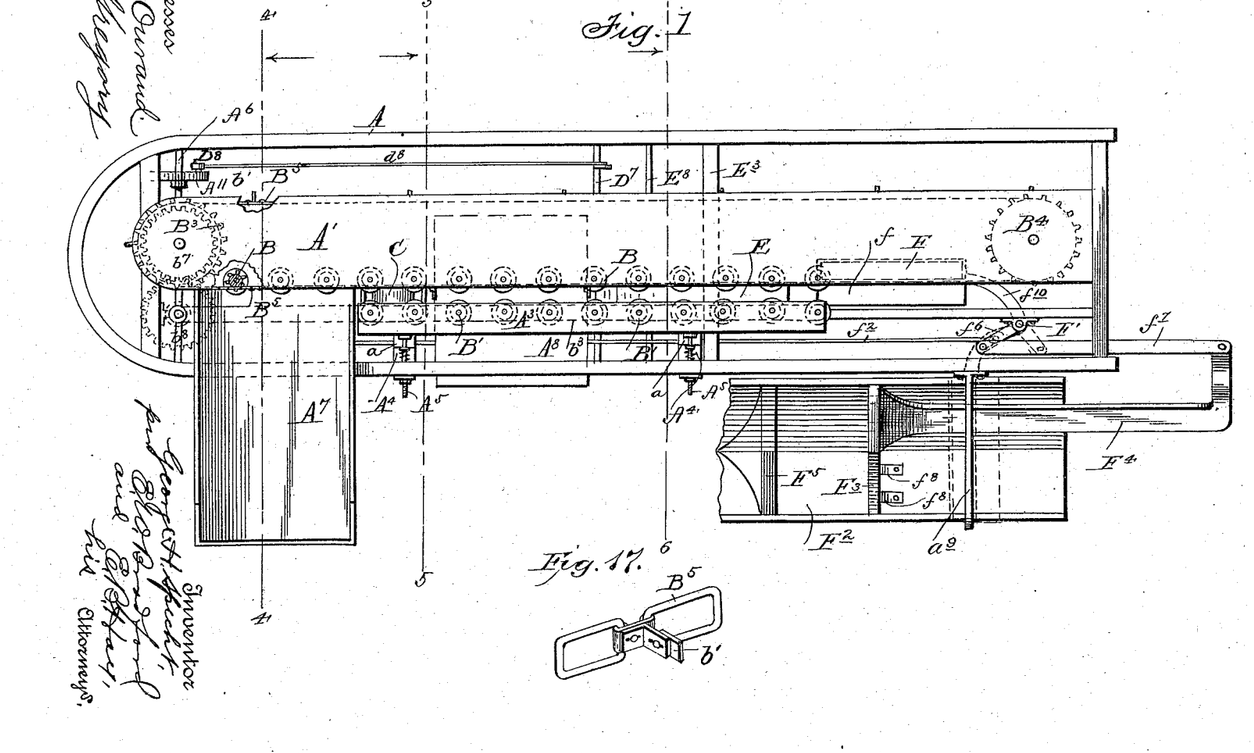
Figure 1 is a top or plan view of a machine embodying my said improvements.
Fig. 17, a detail perspective of a section of the sprocket-chain $B^5$, and Fig. 18 a plan view of the cam $A^9$.
Figure 2:
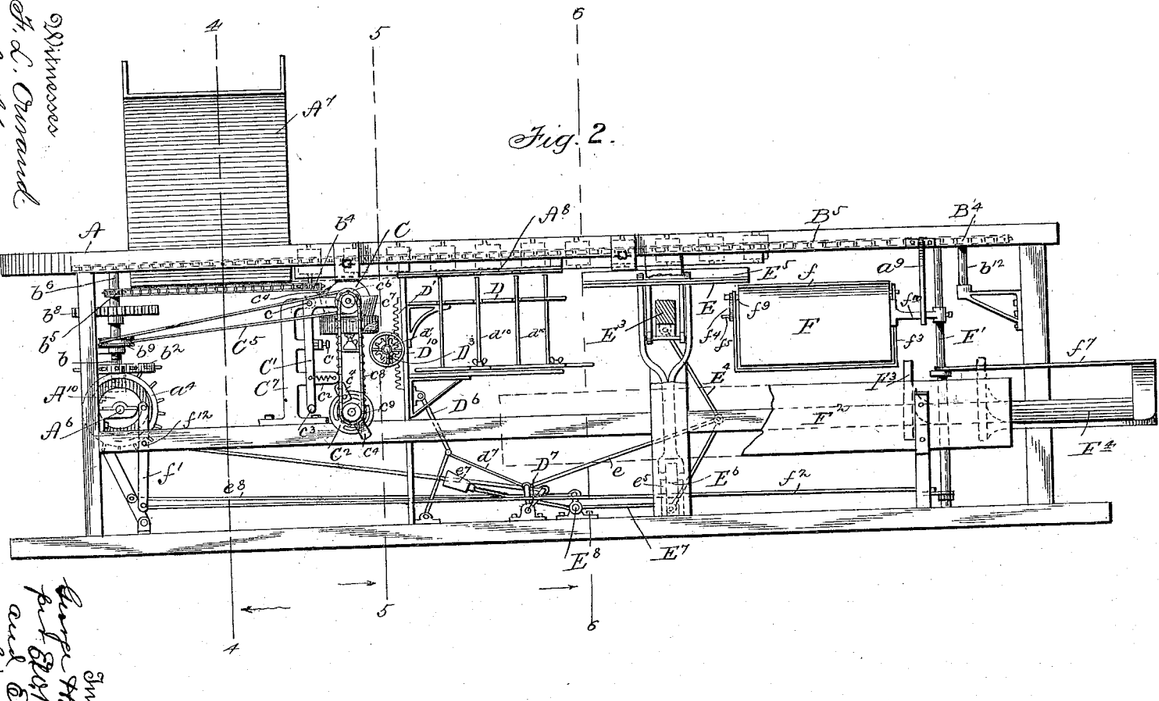
Fig. 2, an elevation of the front side of the same.
Figure 3:
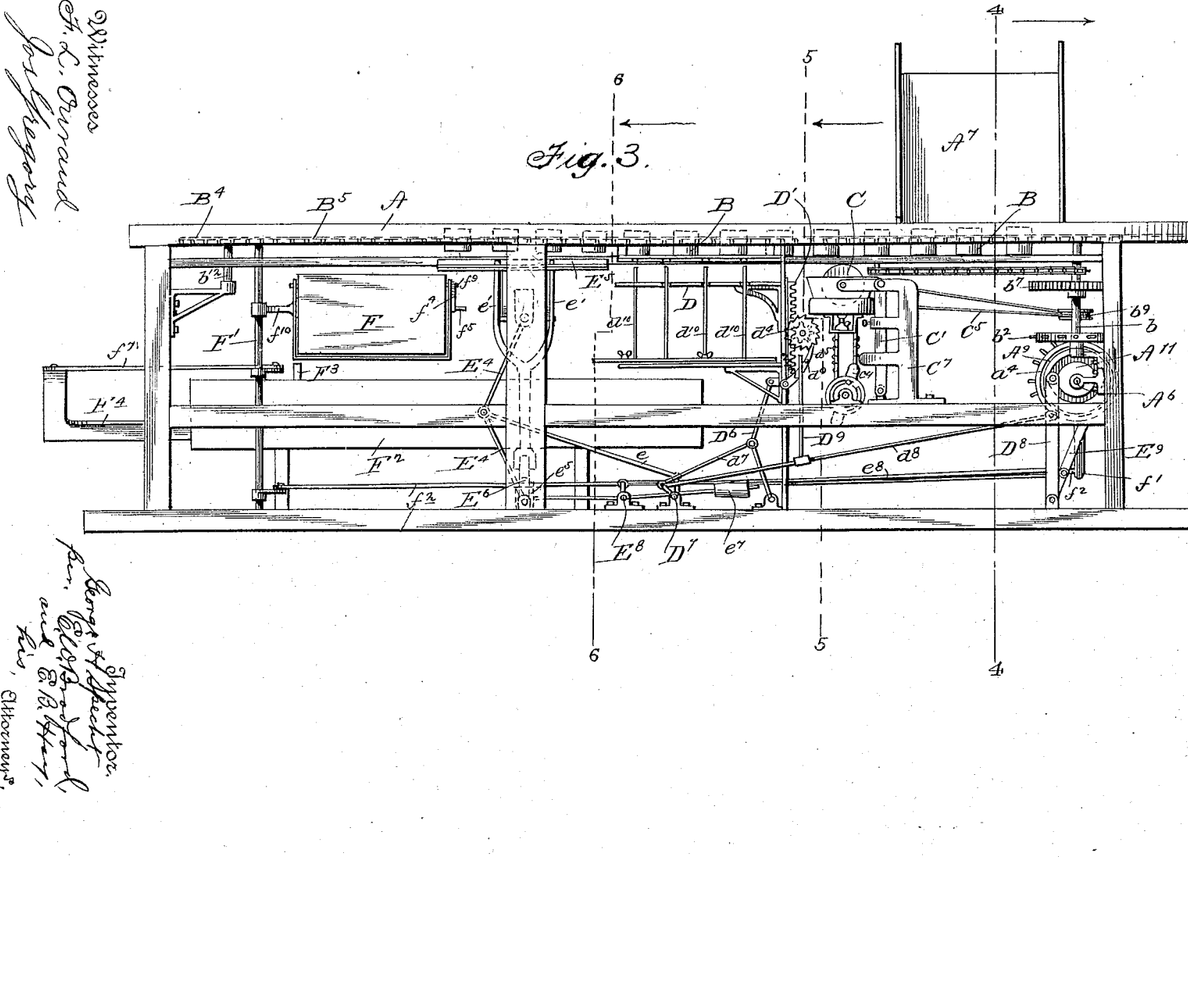
Fig. 3, a rear side elevation.

Throughout the specification the term "front end" refers to the end toward the left in Figs. 1 and 2; "rear end," the opposite end; "front side," the side toward the bottom of the sheet containing Fig. 1, and "rear side" the opposite side.

The frame A is of any usual or desired construction, being composed of sills, posts, side pieces, cross-pieces, and braces, arranged to be adapted to support the various parts of the mechanism in the most advantageous and convenient manner, and therefore needs no detailed description except such as may be incidental to the description of the other parts hereinafter.

Figures 10, 11, 12:
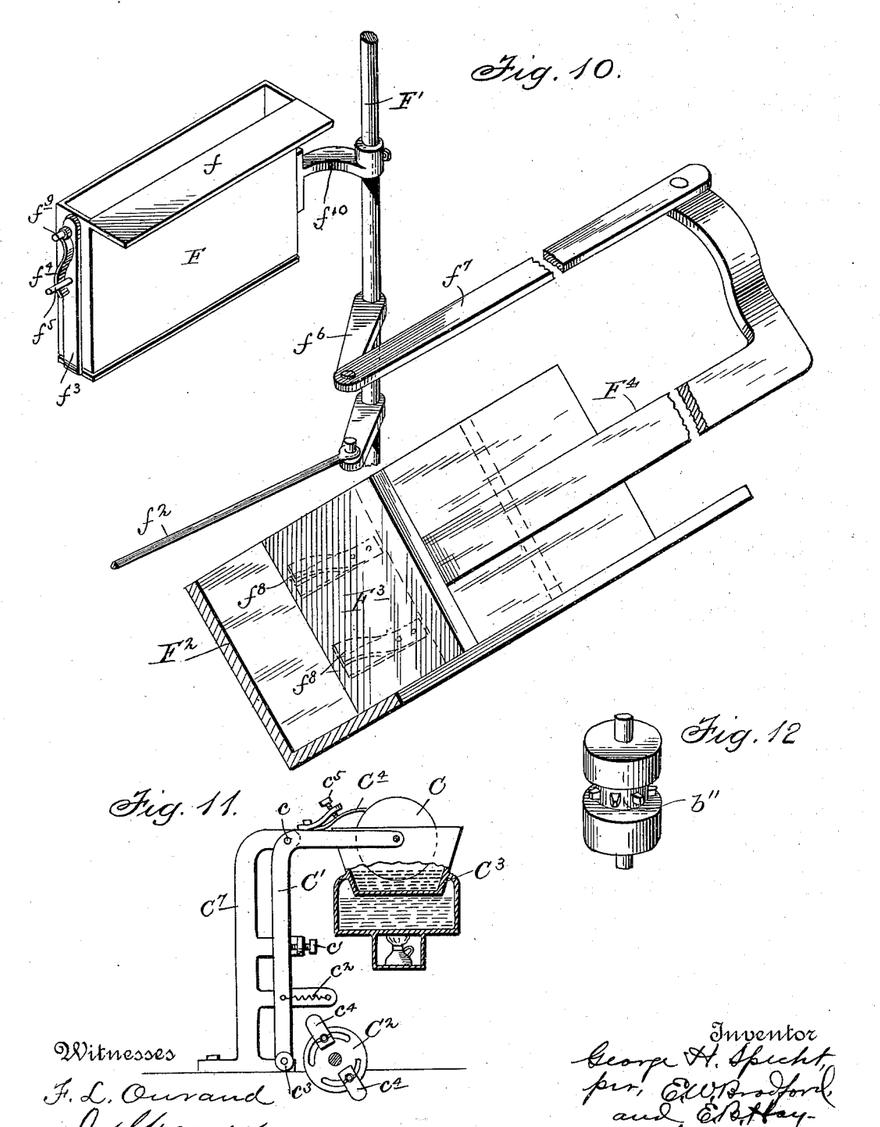
Fig. 10, a similar view of the device for delivering the books from the machine.
Fig. 11, a detail side elevation of the gluing device, partly in section.
Fig. 12, a detail perspective of one of the rolls B or B'.
Figures 13, 15, 16, 18:
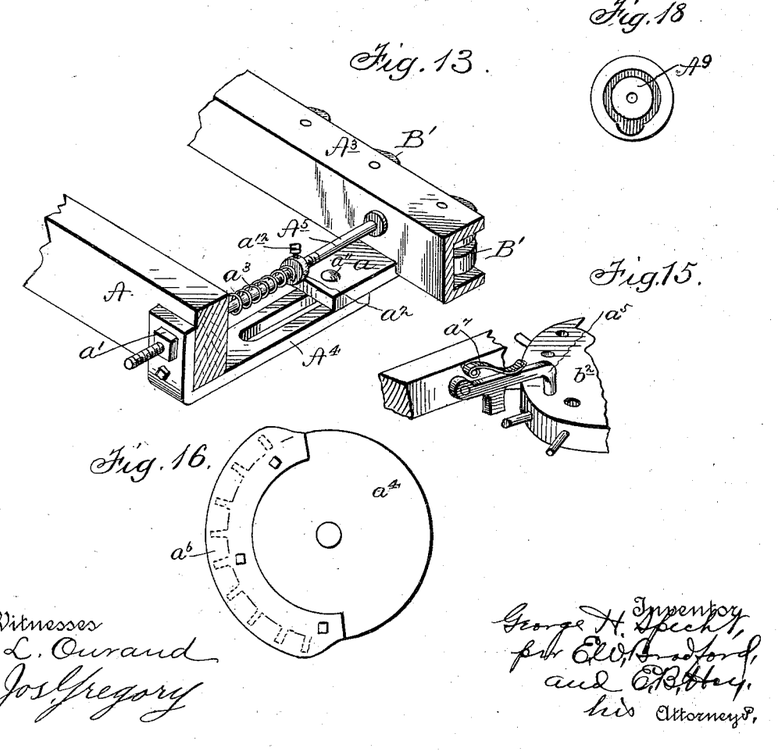

The driving-rolls B B' are of the construction shown in Fig. 12, each being formed with a circumferential depression midway of its length, in which is mounted a sprocket-wheel $b''$, the teeth of which project to a point not quite flush with the smooth surface above and below. Each is also provided with a shaft secured rigidly therein, the ends of which project sufficiently to properly engage the bearings provided therefor. The rolls B are journaled in stationary bearings provided in bars A' and $A^2$, extending longitudinally of the machine and secured the proper distance apart to portions of the frame. The top bar, A', is preferably wide, as shown, extending toward the rear side of the machine sufficiently to cover the sprocket-chain, as will be presently described, while the lower bar, $A^2$, is of only sufficient size to support the bearings properly. The front edges of said bars are in line with each other, and the faces of the rolls, which are also in line, project slightly beyond them, as shown. The line of said rolls B extends from a point near the front of the machine to a point about the rear end of the perfecting-table. The rolls B' are journaled in a housing $A^3$, formed as shown in Fig. 13, the same being both adjustably and yieldingly mounted on the frame A. The faces of the rolls project slightly beyond the edges of the open side of said housing, which is positioned to bring said faces exactly opposite and in the same plane with those of the rolls B.

Two or more horizontal bars $A^4$ (see Fig. 13) are bolted to the front top side piece of the frame A a suitable distance apart and extend in to a point beneath said housing to support the same. Corresponding ears or brackets $a$ are formed on or attached to said housing to rest upon said bars. A bolt $a''$ is mounted in each of said ears and loosely engages a slot in the bar, and thus secures said housing so that it may be adjusted. Above each bar $A^4$ a rod or bolt $A^5$ extends through a horizontal perforation in the rail of the frame above mentioned, the inner end of which bears against the back of said housing and the outer end of which is provided with a nut $a'$. A collar $a^2$ is adjustably secured on said bolt between the rail and housing, and a spring $a^3$ is interposed between said collar and the rail. By this means said housing and the rolls B' carried thereby may be adjusted toward or from the rolls B by simply turning the nuts $a'$ in the proper direction, and the desired tension of the spring may be maintained by adjusting the collar $a^2$, which is preferably formed as a nut and adjusted by turning, the set-screw $a^{12}$ shown therein serving only to hold it in the position desired. Said springs thus normally hold said rolls B' toward the rolls B (their forward position being determined and limited by the nuts $a'$) with a continuous but yielding pressure, whereby they are permitted to yield to accommodate the thickness of books being put through the machine and at the same time press against said books with sufficient force to support them and feed them forward through the machine. The front roll B' is that distance behind the front roll B which will provide sufficient space for the book to be feed into the machine in front of it. In the drawings it is shown as opposite the fourth roll B, but with different-sized rolls or to provide receiving-openings of different lengths other relative arrangements might be found necessary, as will be readily understood.

At the front of the machine and in the same horizontal plane as the sprocket-wheels of the rolls B and B' is mounted a sprocket-wheel $B^3$ on a vertical shaft $b$, which is journaled in suitable bearings on appropriately-located cross-bars of the frame. A similar sprocket-wheel $B^4$ is located at the opposite end of the machine on a shaft supported in suitable bearings, and around said two wheels runs a belt sprocket-chain $B^5$. At intervals throughout the length of said chain it is provided with outwardly-projecting fingers or clips $b'$, as shown. (See Figs. 1 and 17.) By noticing Fig. 17 particularly it will be seen that said clips are mounted by means of slots and set-screws to be adjusted on a base, which in turn is adjustably mounted in like manner on the chain for the purpose which will be hereinafter described. Said sprocket-wheels $B^3$ and $B^4$ are considerably larger than the rolls B; but their front edges are located in line with the front edges of the sprocket-wheels of said rolls B, with which the front side of said chain $B^5$ carried thereby engages. Said shaft $b$ is driven from a main driving-shaft $A^6$, journaled in bearings provided on the front posts of the framework at the proper point. On the lower end of said shaft $b$ is mounted a gear-wheel $b^2$, which revolves in a horizontal plane, and on said shaft $A^6$ is mounted a gear-wheel $a^4$, which meshes therewith. The cogs of said gear-wheels $b^2$ and $a^4$ preferably consist of pins inserted in perforations in the peripheries of said wheels, said pins or cogs in the wheel $a^4$ extending around only a portion of its circumference, forming an "interrupted" gear, whereby the shaft $b$ is given an intermittent motion for the purpose which will be presently described.

Figure 4:
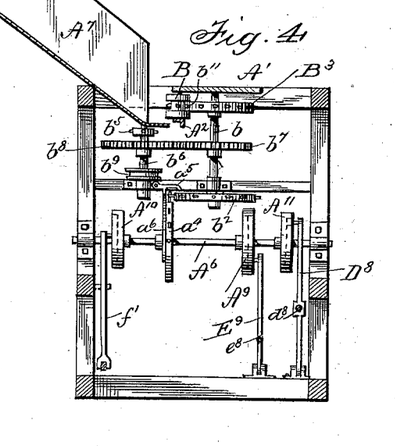
Fig. 4, a vertical cross-section looking in the direction indicated by the arrows from the dotted line 4 4 in Figs. 1, 2, and 3.

The series of rolls B' are connected by a sprocket-chain $b^3$, which runs around the entire series, engaging with the sprocket-wheel of each. On the lower end of the shaft of the roll B' at the front end of the series (below the housing $A^3$) is mounted a sprocket-wheel $b^4$, which is connected to a similar sprocket-wheel $B^5$ on a short upright shaft $b^6$, journaled in suitable bearings on the frame parallel with the shaft $b$. Said shaft $b^6$ is driven from the shaft $b$ by means of a gear-wheel $b^7$, which meshes with a similar gear-wheel $b^8$ thereon. By this means, as will be readily understood, said two series of rolls B and B' are positively driven and at the same speed, the several intermeshing gear-wheels being of corresponding sizes. The wheel $a^4$ is provided with perforations throughout its periphery, and thus by the insertion or removal of one or more pins the length of the continuous movement of the sprocket-chains can be varied, as desired. I also provide a lock $a^5$, (see Figs. 4 and 15,) which is adapted to engage with perforations in the top face of said wheel $b^2$ and lock it at the position it occupies when the last tooth upon the toothed segment of the wheel $a^4$ becomes free from engagement with it, said perforations being located to accomplish this result. A segmental flange $a^6$, upon the periphery of the wheel $a^4$, engages a portion of said catch or lock and holds it free from the wheel $b^2$ while the two wheels are in engagement, but releases it immediately upon the engagement becoming broken, when a spring $a^7$ at once forces it into that perforation in the top face of wheel $b^2$ which at that moment registers with it.

Upon the frame near its front end and projecting out on the front side thereof is mounted an inclined feeding-chute $A^7$, into which the books to be covered are deposited upon their backs and with their lengths in the direction of the length of the machine. Said chute is shown as located opposite the first three rolls B, its bottom extending slightly beneath their lower ends, forming a horizontal receiving-table. The books are thus received into the machine with their backs slightly beneath the line of the lower end of said rolls.

The glue-applying roll C (see Figs. 2 and 11) is located just in the rear of the front roll B', its top surface being normally in the path of the back of the book. It is journaled in suitable bearings between the forks of the horizontal arm of a bifurcated lever C', which lever is pivoted at its angle on a standard $C^7$, or other suitably-arranged portion of the frame, on a pivot $c$. A set-screw $c'$ is provided in a projecting ear on said standard in the path of the vertical arm of said lever, which serves as a stop whereby the upward movement of the roll may be limited at the point desired. Said arm is held forward against said stop by means of a coiled spring $c^2$, which is connected thereto and to a portion of the frame to secure this result. On the lower end of said vertical arm of said lever an antifriction-roller $c^3$ is journaled, and in suitable bearings on the frame alongside said lever is mounted a wheel $C^2$, provided with segmental slots, in which are secured trips $c^4$, which are adjustable therein by means of set-screws. A glue-pot $C^3$ is supported on the frame around said roll C, which is in position to take up the glue therein. Said glue-pot is of a common construction, having a chamber for water beneath the chamber containing the glue, and beneath the water-chamber a bracket, upon which may be placed a spirit-lamp for heating said water. A scraper $C^4$, of spring metal, is mounted upon the frame with its front edge upon the surface of said roll for the purpose of regulating the amount of glue which shall be carried against the back of the book thereby. The force with which said scraper bears upon said roll, and consequently the amount of glue to be distributed, may be regulated by a set-screw $c^5$, mounted in a rigid bracket and adapted to bear upon the upper surface thereof. On the outer end of the shaft of said roll is mounted a belt-pulley $c^6$ and a sprocket-wheel $c^7$. From said belt-pulley a belt $C^5$ runs to a similar pulley $b^9$ on the upright shaft $b^6$, by which said glue-roller is driven simultaneously with the sprocket-chains and rolls B and B'. From the sprocket-wheel $c^7$ a sprocket-chain $c^8$ runs to a sprocket-wheel $c^9$ on the shaft of the wheel $C^2$, by which means motion is also communicated thereto at the same time said glue-roller is in motion. By this means immediately after the roll is started the first trip $c^4$ comes in contact with the roller $c^3$ on the lower end of the upright arm of the lever C' and throws said arm forward, which also throws the roll downward out of the path of the book. The operation of this gearing is so timed that said roll will be forced down just as the first end of the book passes over it, so that for a short space at the extreme end the back of said book will receive no glue. Said roll is thus held away from the back of the book but a moment, the spring $c^2$ operating to return it to bear against the book-back and apply glue thereto immediately upon being released from the trip $c^4$. When the book has advanced over the roll to that point the same distance from its other end which is left free from glue at the first end which passes over, the other trip $c^4$ comes in contact with the roll $c^3$, again forcing down said roll free from the path of the book until said book shall have passed beyond said roll. By this means a short space of the book-back at each end is left free from glue, which is very desirable, in order that said glue may not be forced out upon the ends or edges of the book or upon the operating parts of the machine during the further operation.

Figure 5:
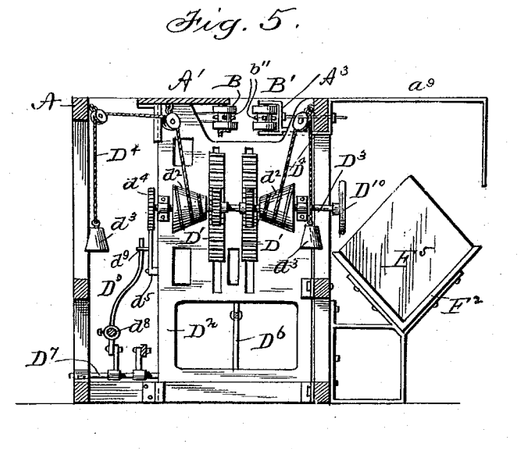
Fig. 5, a similar view looking in the direction indicated by the arrows from the dotted line 5 5 in same views.

The cover-table D is in many particulars similar to the cover-table shown in the Hull patent, before referred to, although differing in several details. It is mounted in a horizontal position upon vertical rack-bars D', which rack-bars are of a form similar to that shown in Fig. 14, and are mounted to slide in vertical ways in a frame $D^2$, the table being mounted on one side of said frame attached to the back of said bars, which extend through said ways and have their faces upon the opposite side of said frame. Said frame $D^2$ may be a thin casting or plate, of suitable size and form, mounted to have a limited vertical movement in ways on the main frame of the machine, as shown in Fig. 5. It is provided with journal-bearings $d$, in which is journaled the shaft $D^3$, upon which are mounted pinions $d'$, which engage with the rack-bars D', carrying the table D. Cone-pulleys $d^2$ are also mounted upon said shaft, one at each end, which pulleys are provided with spiral grooves. Attached to each cone in the groove at a point near its small end is a cord $D^4$, which is wound around said cone, following said groove, and then passes up and through sheaves secured in suitable positions on the framework of the machine, their other ends having weights $d^3$ attached thereto. Said weights, operating through said cords and cone-pulleys, normally tend to revolve said shaft $d^3$ in that direction which will elevate the rack-bars D' and the cover-table D carried thereby. On the rear end of said shaft $D^3$ is mounted a ratchet-wheel $d^4$, with which a pawl $d^5$, pivoted to the edge of the frame $D^2$, engages, it being normally held into engagement by means of a spring $d^6$. A toggle $D^6$, one arm of which is connected to the frame $D^2$ and the other arm of which is connected to a suitable clip provided on the lower portion of the frame A, serves to operate said frame $D^2$ up and down. Said toggle is connected by connecting-rod $d^7$ to a crank-arm on a rock-shaft $D^7$, journaled in suitable bearings on the sills of the framework. Said rock-shaft is operated by a cam $A^{11}$ on the main driving-shaft $A^6$, which operates through a lever $D^8$, the lower end of which is hinged to a portion of the framework and the upper end of which engages said cam, and a connecting-rod $d^8$ connected to said lever at one end and at the other end to another crank of said rock-shaft. Thus as said driving-shaft revolves said shaft $D^7$ is rocked and the toggle operated to move said frame $D^2$ and the cover-table and all the mechanism carried thereby up and down. A trip-rod $D^9$ is mounted on said rod $d^8$ and extended up to that point which, when the rod has traveled toward the rear of the machine its full limit, will be a short distance behind and in the path of a pin $d^9$ on the pawl $d^5$.

In operation, the covers to any desired number are placed upon the table D, which is run down to a low position by means of a hand-wheel $D^{10}$ on the front of the shaft $D^3$. Adjustable guides $d^{10}$ are mounted on a shelf beneath said table D, consisting of upright rods carried in a suitable base and adjustable by means of slots and set-screws, as shown, said table being also slotted to permit of the adjustment. The covers are so placed upon said table that the portion which is to form the back of the books will come directly in line with said back as it travels through the machine. The guides $d^{10}$ are then adjusted to hold the covers in this position. Cheek-plates $A^8$ are provided on the frame similar in form to those shown in the Hull patent, before referred to, their under faces being in that plane on which the back of the book travels through the machine. Thus as the driving-shaft revolves the cam $A^{11}$ operates to draw the rod $d^8$ forward, rocking the shaft $D^7$, and through the crank, connecting-rod $d^7$, and toggle $D^6$ elevates the frame $D^2$ and all it carries. Before reaching the limit of its forward motion the trip $D^9$ strikes the pin $d^9$ on the pawl $d^5$ and releases said pawl from its engagement with the ratchet-wheel $d^4$, which immediately permits the weights $d^3$, through the cords $D^4$ and the cones $d^2$, to rotate the shaft $D^3$ and quickly elevate the cover-table D, through the rack and pinion connection, until the top of the pile of covers carried thereby strikes the cheek-plates $A^8$. The operation of the various mechanisms is so timed that a book with its back freshly glued is at this moment stationary at the point immediately above said covers, the top one of which is thus firmly pressed against said back and adheres thereto. Just as this is completed the rod $d^8$ starts on its backward movement, which releases the pawl $d^5$ and permits the spring $d^6$ to throw it back into engagement with the ratchet-wheel $d^4$, which locks the cover-table to the frame $D^2$, which immediately moves away from the book-back as said frame is carried downward, the top cover being left adhering to said book-back and being carried forward to the next position.

Figure 6:
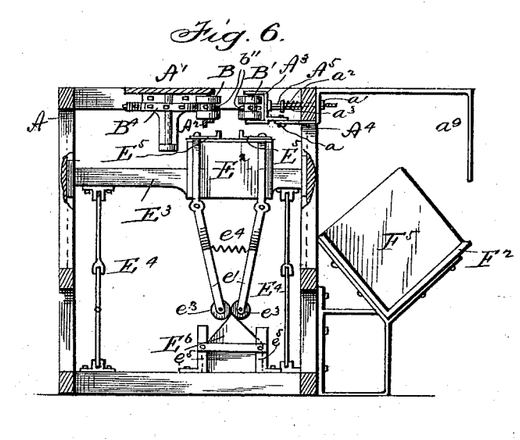
Fig. 6, a similar view looking in the direction indicated by the arrows from the dotted line 6 6 in same views.
Figures 7, 8, 9, 14:
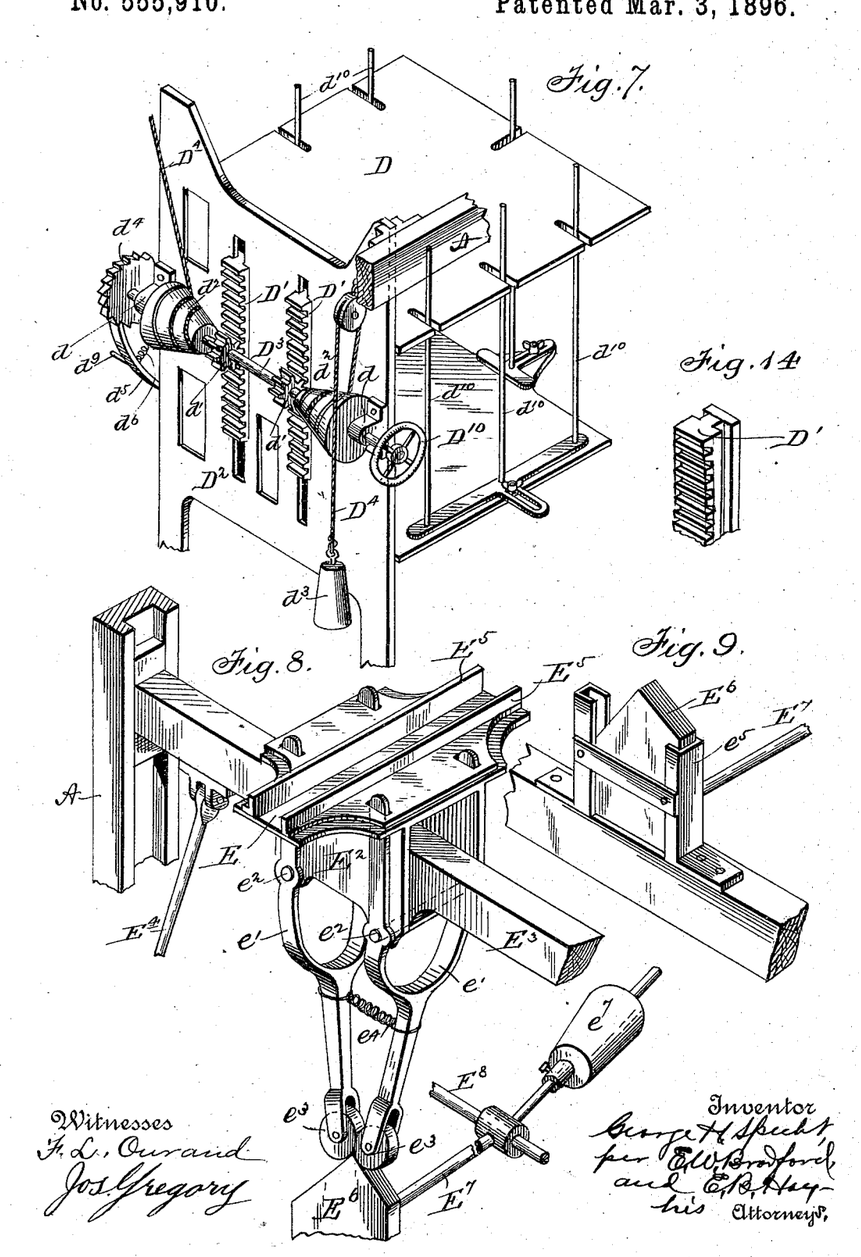
Fig. 7, a detail view in perspective of the cover-table and supporting parts.
Fig. 8, a similar view of the perfecting-table.
Fig. 9, a detail perspective, on an enlarged scale, of the device for operating the perfecting-jaws of the said table.
Fig. 14, a detail perspective of a fragment of one of the rack-bars D'.

The perfecting-table E extends longitudinally beneath the path of the book, being of the length corresponding to the length of the cover-table, and thus adapted to operate upon books of such lengths as said table is adapted to carry covers for. It is mounted upon a box-like casting $E^2$, which in turn is securely fastened to a cross-bar $E^3$, adapted to slide vertically in ways formed in the inner faces of two uprights forming a part of the frame of the machine and located opposite each other at the proper point. Said bar is operated by means of toggles $E^4$, located one on each side of the machine and connected by connecting-rods $e$ to cranks on the rock-shaft $D^7$. Perfecting-jaws $E^5$ are mounted on the top of said table, one on each side of the path of the book, the one under the stationary rolls B having its face substantially in line with the face of said rolls, while the one under the rolls $B'$ is located so that its face will be somewhat back of the line of the face thereof. Each of said jaws is mounted loosely on the table E and is adapted to be operated by a lever $e'$, which is bifurcated at its upper end, each branch of its fork extending up on opposite sides of the casting $E^2$, being pivoted on the lower corner thereof on a pivot $e^2$. The upper ends of said forks extend through transverse slots in the table E and engage with perforations in outwardly-extending flanges of said jaws. The lower ends of said levers are inclined toward each other and have rollers $e^3$ on their lower ends, which normally rest against each other, which position is maintained by means of the coiled spring $e^4$, which keeps said jaws open. On a cross-bar of the frame, immediately beneath the lower ends of said lever, is provided a vertical way $e^5$, in which a block $E^6$, with a wedge-shaped upper end, is adapted to slide. Said wedge is mounted upon a lever $E^7$, which is fulcrumed at a point intermediate of its length on a rock-shaft $E^8$, and has a weight $e^7$ adjustably mounted on its outer end. The connection between said lever and said rock-shaft is rigid, and thus as said rock-shaft is operated said wedge is also operated. Said rock-shaft is held stationary until its operation is required by means of a cam $A^9$ on the main driving-shaft $A^6$, being connected therewith by means of a lever $E^9$, hinged at its lower end to a suitable portion of the frame and at its upper end connected with said cam, and a connecting-rod $e^8$, connected at one end to said lever and at the other end to a crank on said rock-shaft. Said cam $A^9$ is formed so that for the greater portion of its circumference its operating-face is concentric with the shaft, its eccentric portion being short and consisting of an abrupt depression in said operating-face. (See Fig. 18.) Thus as said cam rotates the upper end of the lever $E^9$ is held in the same relative position and the rock-shaft $E^8$ is held in a stationary position, which position is that which holds the wedge down, as shown in Figs. 6 and 8. As soon as the depression in the operating-face of said cam is brought to that point where the engaging portion of the lever will drop into it, the weight immediately falls by its own gravity and rocks the shaft, forcing the wedge up between the rollers $e^3$, throwing the lower ends of the levers $e'$ outward and forcing the jaws $E^5$ toward each other. This operation is so timed that it occurs when a book having a cover adhering thereto as it comes from the cover-table is stationary at this point and the perfecting-table E has been elevated through the rock-shaft $D^7$ until it bears firmly against the back of said book. The jaws coming together at this time operate to break said cover up around the sides of said book and form the back in a perfect manner, as will be readily understood. As will be noticed by an inspection of the drawings, one face of said wedge $E^6$ is formed of a greater angle than the other. This face is located to operate the lever carrying the jaw under the rolls $B'$, which has to travel a greater distance than its companion jaw in order that both sides of the book may receive a uniform pressure and not be twisted as it is held between the rolls. By forming the cam $A^9$ as described, which practically at the point desired entirely frees the shaft $E^8$ and permits said shaft to be entirely operated by the weight, a uniform pressure is given the sides of the book regardless of the thickness thereof, and by having said weight adjustable said pressure may be regulated as desired.

The book-receiver F consists of a box-like receptacle mounted upon a vertical rock-shaft $F'$ near the rear end of the machine. It is secured to said rock-shaft by means of an arm $f^{10}$, curved so that when turned to a position in line with the length of the machine its top or mouth will be just back of the path of the book, and a shelf $f$ formed on its upper outside corner will be directly beneath said path. Said rock-shaft $F'$ is operated by a cam $A^{10}$ on the main driving-shaft $A^6$ through a lever $f'$, fulcrumed on a pivot $f^{12}$ on a part of the frame operated by said cam and a connecting-rod $f^2$, connecting said lever to a crank on said rock-shaft. The bottom of said receptacle is hung on pivoted arms $f^3$, the lower ends of which are connected to the ends of said bottom. They extend up alongside each end of said receptacle to near its top, where their upper ends are pivoted on pivots $f^9$. A spring $f^4$ normally holds said bottom in its closed position. A trough-like receptacle $F^2$ is mounted on suitable supports along the front side of the machine, as shown, into which the books are deposited, as follows: The operation of the mechanism is so timed that when the book has been released from the perfecting-table the rolls B and $B'$ carry it forward until it is free therefrom, when it rests upon the shelf $f$ of said receptacle F, which at this time stands in the position to receive it, the upper edges of said book being yet between portions of the frame which steady it in a vertical position. As soon as said book is entirely free from the rolls B and $B'$, the shaft $F'$ begins to turn, swinging the receptacle outward and the shelf from under the book, which is held by the frame until this is done, and then falls into the receptacle. The outwardly-extended sides of the cover are thus still further folded toward the sides of the book and also serve to steady it as it slides downward between the sides of said receptacle. Said receptacle swings outward until it stands in a position at right angles with the machine, when a pin $f^5$ on the arm supporting the bottom, which is hinged to the outer end of the box, strikes a downwardly-projecting bar $a^9$, secured to the frame of the machine, which operates to arrest the motion of said bottom, while the motion of the receptacle is continued sufficiently to pass over said bottom and permit the book to fall into the trough $F^2$ beneath. The book is deposited immediately in front of a follower $F^3$, which is reciprocated by means of a connection with the rock-shaft $F'$, consisting of a rearwardly-projecting arm $F^4$ on said follower, a crank $f^6$ on said rock-shaft and a rod $f^7$ connecting the two. As said shaft starts back with the receptacle F to receive the next book, said follower is pushed forward, pushing the book in front of it over springs $f^8$ attached to the sides of said trough so that their front ends normally project above the surface thereof. As said receptacle reaches the position to receive another book, said follower has advanced sufficiently to push said book beyond the front ends of said springs, and as it recedes said springs come up in front of said book and prevent it from falling back. In the forward end of said trough is placed loosely a block or weight $F^5$, which sustains the books in a vertical position from that side. Thus as the books are delivered they are automatically deposited in a vertical position in said trough. As said trough becomes filled, the books are removed and the block $F^5$ pushed back against the front of the pile, as will be readily understood.

The operation of my improved book-covering machine, as herein described, may be recapitulated as follows: The parts are all adjusted, geared, and connected, as before described, and the receiving and feeding chute $A^7$ filled with the books to be covered. The clips $b'$ on the sprocket-chain $B^5$ are distributed throughout the length of said chain that distance from each other which represents the distance between the front edges of the cover-table and perfecting-table, and the interrupted gear-wheel $a^4$ on the driving-shaft $A^6$ is provided with teeth throughout a portion of its periphery, which will be sufficient to move said clips from one position to the other at each operation of the wheel $b^2$ and the parts operated thereby. Said clips $b'$ are also adjusted (see Fig. 17) to project that distance beyond the face of the rolls B which is substantially equal to the thickness of the books to be covered. They are also adjusted longitudinally on said chain by the means shown in Fig. 17, so that the book will be brought to the position over the cover-table which shall be the proper position in relation to said cover as it rests on said table. The housing $A^3$, carrying the series of rolls $B'$, is also adjusted so that the space between said rolls and the rolls B will be of the width desired to accommodate the thickness of books to be operated upon. This adjustment is such that as the book is fed forward between said two series of rolls they will bear against its sides with sufficient force to hold it in the same plane throughout the operation and carry it forward as they rotate. The main driving-shaft $A^6$ being then put in motion, the first clip $b'$ comes against the end of the front book in the chute $A^7$, which rests against the faces of the first three rolls B. Said book is thus pushed forward on the table formed by the lower end of the bottom of said chute until it passes between the first pair of rolls B B', and is carried forward over the glue-applying roller C, which operates to glue its back, except for a short space at each end, as before described, and is then carried forward and stops immediately over the cover-table D, which carries a pile of covers. At this moment the cam $A^{11}$, with which it is connected, turns the rock-shaft $D^7$, and through the toggle $D^6$ elevates the frame $D^2$ and the cover-table carried thereby. The pawl $d^5$ being at the same time disengaged from the ratchet-wheel $d^4$, the weights $d^3$, through the connections before described, quickly elevate said table until the top of the pile of covers carried thereby comes against the cheek-plates $A^8$, in which position the top cover of said pile is pressed tightly against the freshly-glued back of the book and adheres thereto. While this operation is taking place, another book has taken the place of said first book, resting against the faces of the first three rolls B', the next clip $b'$ has advanced into contact with the end thereof and it has been started forward into a position over the glue-roll C. At the moment said cover-table has been elevated and the cover applied the rock-shaft $D^7$ rocks back, the ratchet-wheel $d^4$ is locked by the spring $d^6$ returning the pawl $d^5$ into engagement therewith, and said cover-table, with its covers, drops away from the book, as before described. By reason of the cone-shaped pulleys $d^2$ said cover-table is elevated with uniform force regardless of the weight of the pile of covers which it carries. When said table is in a low-down position and filled with covers, the weights, through the connecting-cords, pull from the large end of said cones, thus being afforded additional power to compensate for the greater weight, and when there are but few covers on the table and but little weight they pull from a point nearer the small end of said cones, thus insuring a uniform movement regardless of the position of the table before the movement occurs or the number of covers it carries. It will be seen also that although but few covers are upon the table and it is in a position considerably below the line of the travel of the book, yet it will be elevated to bear against the back thereof immediately upon the release of the ratchet-wheel $d^4$ from its engaging pawl $d^5$. The operation of the table is thus self-adjusting and automatic and can be used to apply many or few covers at one operation of the machine without any change or readjustment of its supporting or operating parts. As soon as the cover-table starts away from the back of the book, to which a cover has thus been applied, the sprocket-chain $B^5$ and the rolls B and B' are again started in motion, carrying said book, with the cover adhering thereto in a horizontal position, forward over the perfecting-table E, the next book being brought to the position over the cover-table and another book being started forward over the gluing-roll. When said books have reached these positions, the rock-shaft $D^7$ again moves forward, operating the cover-table, as just described, and at the same time elevating the perfecting-table E to that point where it will press firmly against the back of said book, setting the cover thereon. Just as said perfecting-table reaches the limit of its upward movement the notch in the cam $A^9$ reaches the knob or roll (not shown) on the lever $E^9$, with which it is connected, which drops into said notch and permits the weight $e^7$ on the lever $E^7$ to drop, elevating the end of said lever carrying the wedge $E^6$, which is forced up between the rolls on the lower ends of the levers $e'$ carrying the perfecting-jaws $E^5$, which are thus forced toward each other and tightly against the sides of said book near its back, which thus breaks said cover up around said sides and perfectly forms the back of the book, while firmly setting the cover thereon. As soon as this operation is completed, the cam $A^9$ operates to draw said wedge from between said levers, the jaws being thus opened by the spring $e^4$, and at the same time the table E drops away from said book. The sprocket-chain $B^5$ and the rolls B and B' at this moment again start in motion, and the book is carried forward onto the shelf $f$ of the receptacle F, which is then in position to receive it. At the same time the other books in the machine are advanced one step, and another book is started forward. While the next operation of the cover-table and perfecting-table is going on, the rock-shaft F' is operated, through the cam $A^{10}$ and the connections, to swing said receptacle outward, the book dropping from the shelf to the bottom thereof as soon as it starts and being deposited in the trough-like receiver $F^2$ when said receptacle reaches a position at right angles with the machine. The follower $F^3$ and sliding weight or block $F^5$ serve to pack said books snugly therein, all as before described, and thus the operation continues until the desired work is accomplished.

While the construction as described is substantially that of the machine as now designed, it will be understood that many changes in the construction and arrangement of details might be made without departing from my invention, and as a matter of fact I contemplate a few such modifications in the next machines built, but regard them as not essential herein, but entirely within the scope of this invention.

Having thus fully described my said invention, what I claim as new, and desire to secure by Letters Patent, is—

1. In a book-covering machine the combination of the supporting-frame, a main driving-shaft, glue-applying mechanism, cover-applying mechanism and mechanism for carrying the books through the machine which carrying mechanism includes intermittingly-driven vertical rolls arranged in lines with a path for the book between them, substantially as set forth.

2. In a book-covering machine, the combination of the mechanism for supporting the books while undergoing the several steps of the operation and also carrying them forward from the position of one step to the position of the next throughout the operation, which consists of two series of upright rolls arranged in lines the adjacent rolls in each line being a distance apart less than the length of the books to be operated upon, intermittingly-driven gear connected to said rolls for driving them, and means for feeding the books to said rolls, substantially as set forth.

3. In a book-covering machine, the combination of the supporting-frame, the driving-shaft, the two series of driving or carrying rolls, the line of the front series of which is enough shorter than the line of the rear series to permit the feeding-chute to pass in front of it to guide the books against a part of the rear series of said rolls, said rolls being provided with sprocket-wheels, a sprocket-chain mounted on sprocket-wheels at each end of the machine and engaging the sprocket-wheels of the rear series of rolls, feeding or pushing clips on said chain, intermittent gear for driving the same, and the glue and cover applying mechanisms, substantially as set forth.

4. In a book-covering machine, the combination of the intermittingly-driven rolls arranged in two lines to form a path for the book between them, the feeding-chute, the bottom of which extends to a point slightly beneath the lower end of the rear line of rolls, forming a receiving-table, the belt running along the line of said rolls carrying clips to engage with and push the books from said receiving-table to between the two lines of rolls, the glue-applying mechanism, and the cover-applying mechanism, substantially as set forth.

5. In a book-covering machine, the combination of the book-carrying mechanism which includes two lines of vertical intermittingly-driven rolls arranged with a path for the book between them, the rolls in each line being less than the length of a book apart, and one line being mounted to be adjusted toward and from the other, and the mechanism for applying the glue and covers, substantially as set forth.

6. In a book-covering machine, the combination of the two series of rolls with a path between them for the book, intermittent gear for driving the same, both series being provided with sprocket-wheels and connected by sprocket-chains, whereby both are positively and uniformly driven, and the glue-applying device and cover-applying mechanism, substantially as set forth.

7. In a book-covering machine, the combination of the book-carrying mechanism, a glue-applying device consisting of the roll C journaled in a glue-pot upon one arm of a pivoted lever, a stop and spring connected with the other arm of said lever, for maintaining the roll at the desired elevation, and a revolving wheel carrying adjustable trips arranged to strike the lower end of said lever upon occasion and throw said roll down at stated periods, and the cover-applying mechanism, substantially as set forth.

8. In a book-covering machine, the combination of the cover-table mounted by means of a rack-and-pinion connection on a vertically-reciprocating frame, cords and weights connected to the shaft of said pinions to normally hold said table in an elevated position, a ratchet-wheel and pawl to hold said table in a fixed position on said frame until said pawl is released, a movable trip adapted to strike said pawl and disengage it from said ratchet-wheel at the desired moment and permit said weights to elevate said table, and mechanism for operating said frame up and down, substantially as set forth.

9. In a book-covering machine, the combination of the cover-table D, mounted on a vertically-reciprocating frame $D^2$ by means of a rack-and-pinion connection, cone-pulleys on the shaft on which said pinions are mounted, which shaft is journaled on bearings on said frame, said cones being provided with spiral grooves, cords connected with said cones and adapted to operate in said grooves, the ratchet-wheel and pawl for holding said table against said weights, the trip for disengaging said pawl, and mechanism for operating said frame, substantially as set forth.

10. In a book-covering machine, the combination of the book-feeding devices, the glue-applying device, the cover-applying mechanism, and the perfecting-table E, mounted upon a vertically-reciprocating bar, and having the perfecting-jaws $E^5$ mounted thereon, one nearer the path of the book than the other, and connected with operating-levers, a wedge with faces of different angles, arranged to slide in ways and engage between the lower ends of said levers whereby said jaws are forced against the sides of the book evenly, said wedge being forced between said levers by the operation of a weight, whereby uniform pressure is afforded regardless of the thickness of the book, substantially as set forth.

11. In a book-covering machine, the combination with the various mechanisms for applying and securing the cover, of a discharging device consisting of the receptable F, having a horizontal table or shelf $f$ upon its front edge, said receptacle being mounted upon a vertical rock-shaft and provided with a hinged bottom, a receiving-trough on the outside of said machine, means for operating said rock-shaft to swing said receptacle outward after receiving the book, and a strike against which a part connected with the hinged bottom will contact at the proper point to open said bottom and discharge said book, substantially as set forth.

12. The combination in a book-covering machine of the discharging-receptacle F, mounted upon the rock-shaft F', and provided with the shelf $f$ which is located to first receive the book as it comes from the machine, mechanism for rocking said shaft, to swing said receptacle containing the book without the machine, and a device for opening said receptacle to discharge the book when in the desired position, substantially as set forth.

13. The combination in a book-covering machine of the mechanism for feeding the book through the machine, and applying the cover thereto, and the swinging receptacle F adapted to receive and discharge the book as described, and the receiving-trough $F^2$, provided with a sliding weight $F^5$, the reciprocating follower $F^3$ and the retaining device $f^8$, substantially as set forth.

14. In a book-covering machine, the combination of the various cover-applying mechanisms, a movable receptacle arranged to receive the book as it comes therefrom, mechanism for moving said receptacle without the machine, a receiver alongside the machine, and mechanism for discharging the book from said movable receptacle into said receiver, substantially as set forth.

15. In a book-covering machine, the combination of the book-driving rolls, the sprocket-chain $B^5$, the intermittent driving-gear, and a locking device arranged to engage with one of the gear-wheels of said gear and lock it at the point where it becomes disengaged from the other, and a segmental flange on said other wheel which engages with a portion of said locking device and holds it out of engagement during the engagement of said two wheels, substantially as set forth.

16. In a book-covering machine, the combination of two series of vertical book driving and carrying rolls arranged in lines with the path for the book between them, and the rolls in each line being less than the length of a book apart, one series or line of which is mounted in a frame or housing, which frame or housing is mounted on the machine-frame by means which permits of its adjustment toward or from the opposite line of rolls and at the same time holds it yieldingly in said adjusted position, substantially as set forth.

17. In a book-covering machine, the combination of the book-driving rolls arranged and geared as described, one series of which is mounted in the housing $A^3$, said housing $A^3$ adjustably mounted on the arms $A^4$, secured to the side of the frame, the rods or bolts $A^5$ extending through perforations in said side of the frame, the inner end of each bearing against a point on said housing, and a nut being provided on its outer end and a spring being interposed between the inner face of said side of the frame and an adjustable collar on said rod or bolt, substantially as set forth.

18. In a book-covering machine, the combination of the two series of book-driving rolls, intermittent gear for driving them, sprocket-chains connecting said gear with sprocket-wheels on said rolls, the shaft carrying the chain driving the front series being geared to the shaft from which the rear series is driven, substantially as set forth.

19. The combination in a book-covering machine of the book-driving rolls geared to intermittent driving-gear, and a belt running along one side of the path of the book having pushing-clips thereon at suitable intervals throughout its length, substantially as set forth.

In testimony whereof I affix my signature in presence of two witnesses.

GEORGE H. SPECHT.

Witnesses:
  E. W. BRADFORD,
  J. R. PARKER.